Jan. 27, 1959  P. D. COMERY  2,871,038
LABYRINTH SEALS

Filed Sept. 22, 1955  2 Sheets-Sheet 1

Inventor
P. D. COMERY
By: Maybee & Legris
Att'ys

Jan. 27, 1959 P. D. COMERY 2,871,038
LABYRINTH SEALS
Filed Sept. 22, 1955 2 Sheets-Sheet 2

Inventor
P. D. COMERY
By: Maybee & Legris
Att'ys

# United States Patent Office 2,871,038
Patented Jan. 27, 1959

2,871,038

LABYRINTH SEALS

Peter Dennis Comery, Cooksville, Ontario, Canada, assignor to Orenda Engines Limited, Malton, Ontario, Canada, a corporation Application September 22, 1955, Serial No. 535,905

1 Claim. (Cl. 286—10)

This invention relates to labyrinth seals used in gas and steam turbine engines and like rotary power conversion machines.

In various places in such rotary power conversion machines in which a vapour or gas is used as the working fluid, it is often necessary to provide seals between the relatively rotating parts or members in order to provide a barrier to the passage of high-pressure gas into regions of relatively low pressure. Because of the high differential in speeds between adjacent relatively rotating parts it is customary to use seals of the labyrinth type which are well known in the art. Labyrinth seals consist essentially of a series of axially spaced circumferential baffles or rings mounted on either of the relatively rotating parts and extending towards the other part so that the peripheral space between the outer circumference of the said rings and the other part is as small as is practicable. The high-pressure gas or vapour passing through this space at each ring experiences a drop in pressure so that after passing the successive rings which constitute the seal, the gas or vapour has fallen substantially to the pressure of the gas on the low-pressure side of the seal.

It will be apparent from the preceding description that it is advantageous for the space between the outer periphery of each ring and the adjacent relatively rotating surface to be as small as possible. In practice, however, the components of all rotary power conversion machines are subject to distortion due to centrifugal forces, temperature variations and, particularly in the case of gas turbine engines, to acceleration and gyroscopic forces necessitating certain minimum clearance between the rings and the adjacent relatively moving surfaces so as to avoid rubbing contact.

In gas turbine engines of the type commonly used to propel present day aircraft, weight is of extreme importance and, therefore, it is desirable that a labyrinth seal should increase the weight of the engine as little as possible.

In these engines it is also desirable that the labyrinth seal be so constructed that should contact be made between the relatively rotating members due to distortion of the parts under the influence of centrifugal force, temperature variations, acceleration or gyroscopic forces, no serious damage will result.

It is, therefore, an object of the present invention to provide a labyrinth seal in which the glands or rings can be constructed of relatively thin material and, at the same time, provide a stiff structure to withstand the distorting forces normally encountered in operation.

It is a further object of this invention to provide a seal including glands or rings which, if they should come into contact with a rotating surface, will distribute the rubbing load over a relatively wide area of that portion of the shaft in close proximity to the ring and will, therefore, reduce the tendency to cause excessive wear in the shaft.

The means for realising the objects outlined above and the advantages which are obtained by the labyrinth seal which is the subject of this invention will be apparent from the following description of the preferred embodiment when read in conjunction with the appended drawings in which like reference numerals denote like parts in the various views and in which.

Figure 1:
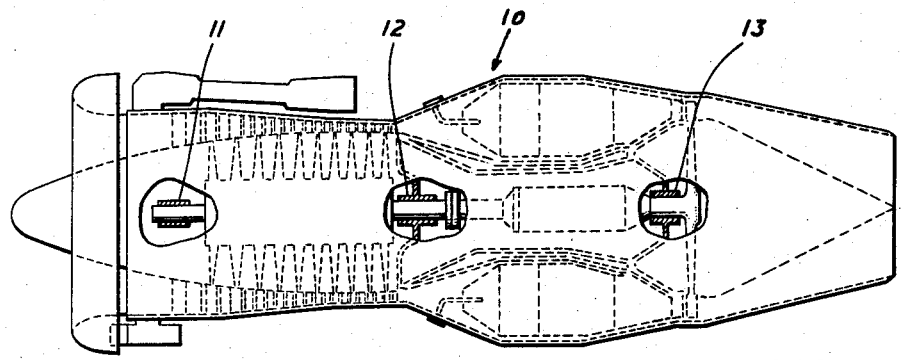
Fig. 1 is a side elevation view of a gas turbine engine employing labyrinth seals constructed in accordance with this invention.

In the drawings, a gas turbine engine 10 of the aircraft type is illustrated, by way of example only, with portions cut away to show three bearing supports for the main rotor shaft. The bearing supports are indicated at reference numerals 11, 12 and 13. The labyrinth seal which is the subject of this invention is particularly adapted to be used in such a location but it is, of course, not to be construed as limited thereto.

Figure 2:
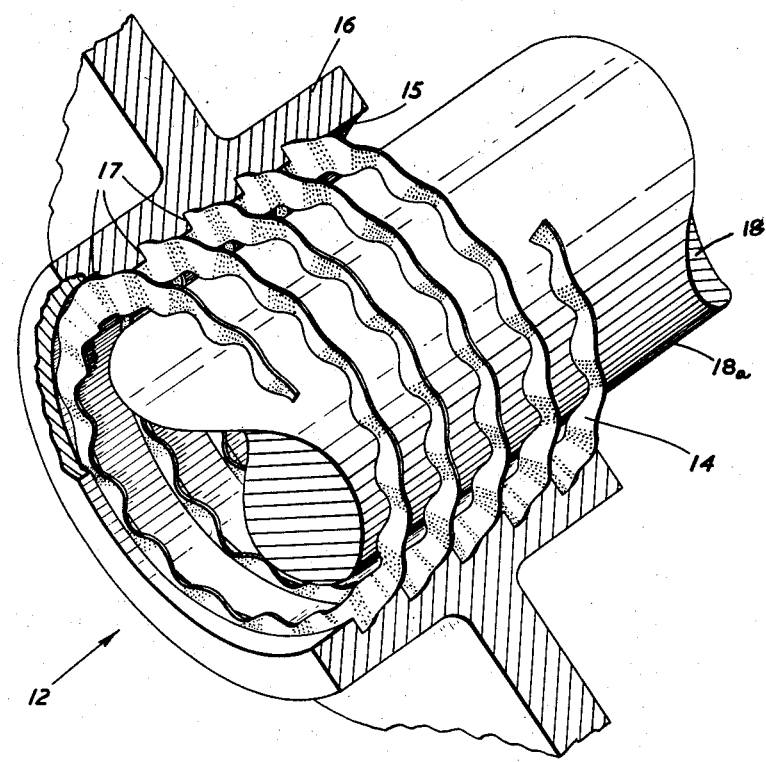
Fig. 2 is a detailed perspective view of a portion of Fig. 1 showing the labyrinth seal with portions broken away to show the construction.

In Fig. 2 the seal 14 is illustrated as mounted on the cylindrical internal surface 15 of a member 16 which surrounds a shaft 12. While the member 16 is shown in Fig. 2 as having a cylindrical inner surface, it is to be understood that a member having a tapered or conical inner surface could be used as well. In fact, any surface in which an uninterrupted helical groove may be cut is suitable for mounting the labyrinth seal of this invention. The seal consists of a light strip 14 of suitable material, such as steel, which is set in helical form in a helical groove 17 which is cut in the surface 15 of the member 16.

The shaft 18 is rotatably supported by journal bearings (not shown) in a position such that the distance between the surface 18a of the shaft 18 and the inner edge of the steel strip 14 is as small as is practical having regard to the expansion of both the shaft and the seal under elevated operating temperatures and the displacement of the shaft under centrifugal, gyroscopic and gravitational forces encountered during operation. The distance from the surface of the shaft to the inner edge of the seal is, of course, effectively constant about the circumference of the shaft.

Figure 3:
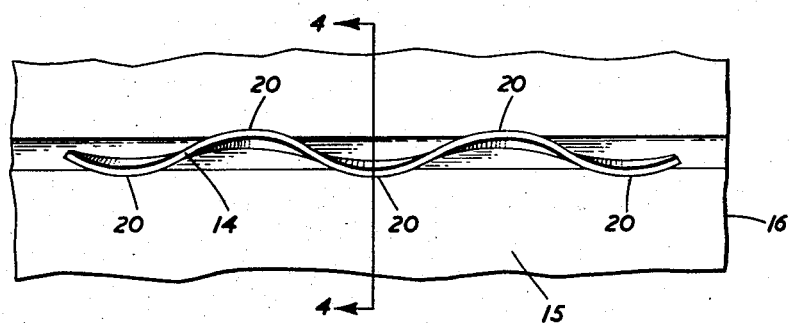
Fig. 3 is a plan view of one of the strip seals of the invention.
Figure 5:
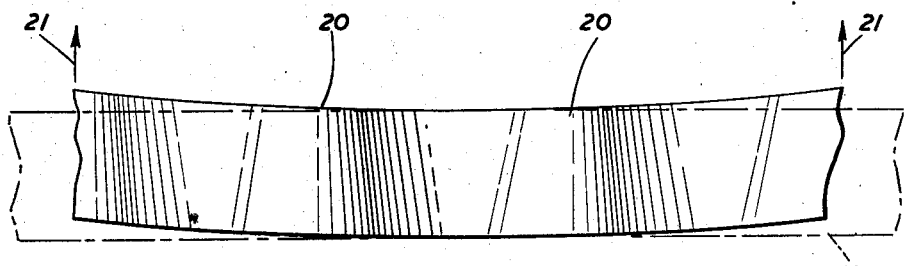
Fig. 5 is a diagrammatic view of one of a strip before and after crimping, the strip before crimping being shown in dotted lines.
Figure 4:
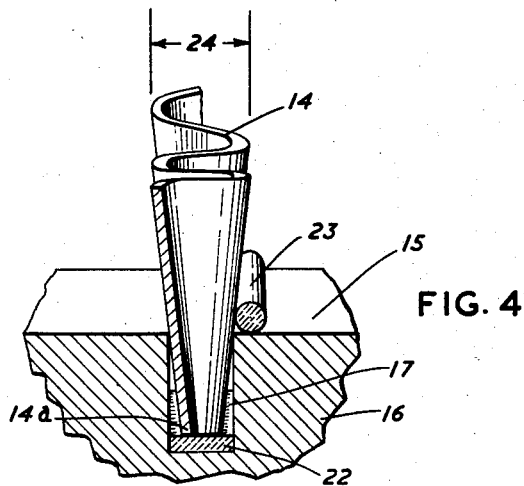
Fig. 4 is a section through line 4—4 of Fig. 3 showing the method of securing the strip seal in position.

In Figs. 3, 4 and 5, a section of the seal strip 14 is shown and, in Fig. 5, it can be seen how a strip 19 of thin steel may be formed with crimps 20 along one edge to cause the strip to bend in the direction indicated by the arrows 21 in Fig. 5. The crimps 20 are formed alternately in opposite directions as seen in Fig. 3, the extent to which the metal is deformed to produce the crimps depending upon the radius to which the seal is desired to conform. If the radius of the supporting member for the seal is relatively large, as shown in Fig. 2, the crimps are of relatively small magnitude. However, if the radius is small, the magnitude of the crimps would need to be considerably greater to enable the strip to conform to the smaller radius. The crimping of the thin steel strip greatly increases its rigidity and enables a much thinner strip to be employed than would be the case if the crimping were not done.

In Fig. 4, the strip 14 is shown seated in a groove 17 cut in the surface 15 of a supporting member 16. The groove 17 is, according to the preferred construction, a helical groove (see Fig. 2) although it may be annular, in which case the strip 14 is cut to a length which will cause the free ends to abut one another when the strip is seated in the groove.

A band 22 of brazing material occupies the bottom of the groove 17 and, under the influence of heat, will weld the lower edge 14a of the strip to the bottom of the groove to retain it in position. When the strip 14 is formed in the crimping operation, the radius which will be occupied by the strip in the "at rest" position is made somewhat larger than the radius of the surface which will support the strip so that the natural resiliency of the sealing strip 14 will tend to hold it in the groove until the welding operation is complete. This resiliency also serves to force the strip 14 against the brazing band 22 thereby imbedding itself in the brazing material as soon as the latter becomes fluid under the influence of heat.

As an alternative method, the brazing material may be replaced by or augmented with a ring 23 of similar material which lies on the surface 15 of member 16 adjacent the groove 17. Heat applied to ring 23 will cause it to melt and capillary action will cause it to flow into the groove 17 to securely braze the seal 14 in the groove.

During normal operation of the machine in which the labyrinth seals of this invention are used, the shaft 18 may be displaced radially due to the forces which are exerted thereon such as centrifugal, gyroscopic or gravitational forces on an aircraft in flight. If this displacement is sufficient to cause a rubbing contact between the surface of the shaft and the inner edge of the seal strips, this rubbing contact will, with the labyrinth seal of the present invention, be distributed axially along the surface of the shaft over an area as wide as the distance represented by the arrow 24 in Fig. 4 of the drawings. This distribution of rubbing contact, when it occurs, will reduce the wear on the shaft and will retard the increase of the distance between the shaft and the seal due to wear.

From the foregoing description it will be seen that a labyrinth seal has been provided which will be less prone to wear, which will be of rigid construction and which will enable lightweight material to be used thereby increasing the power to weight ratio of the engine.

While the preferred embodiment of the invention has been described and illustrated in detail, it is to be appreciated that minor modifications may be made in the construction of the device without departing from the spirit of the invention or the scope of the appended claim.

What I claim as my invention is:

A labyrinth seal comprising a mounting surface which is a surface of revolution, an uninterrupted helical groove cut in the mounting surface, a metallic strip of helical configuration seated in and brazed in the groove, the strip having crimps formed therein, each crimp extending from one side of the strip to the other side and being of greater magnitude adjacent the edge of shorter radius than adjacent the edge of greater radius, the width of the groove being substantially equal to the distance through which the material of the strip is displaced in forming the crimps along one of the edges of the strip so that the ridge of each crimp in the strip will contact the edge of the groove thereby forming, in association with the side wall of the groove, an area of capillary attraction for molten brazing material to secure the strip in the groove.

References Cited in the file of this patent
UNITED STATES PATENTS

| | | |
|---|---|---|
| 1,498,894 | Steenstrup | June 24, 1924 |
| 1,915,113 | Wood et al. | June 20, 1933 |
| 1,997,197 | Nigro | Apr. 9, 1935 |
| 2,692,004 | Matheny | Oct. 19, 1954 |